(12) United States Patent
Chung et al.

(10) Patent No.: US 8,671,375 B1
(45) Date of Patent: Mar. 11, 2014

(54) FUNCTIONAL TIMING ANALYSIS METHOD FOR CIRCUIT TIMING VERIFICATION

(71) Applicant: National Taiwan University, Taipei (TW)

(72) Inventors: Yi-Ting Chung, Taitung County (TW); Jie-Hong Jiang, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 13/672,760

(22) Filed: Nov. 9, 2012

(51) Int. Cl.
*G06F 9/455* (2006.01)
*G06F 17/50* (2006.01)

(52) U.S. Cl.
USPC .......................... 716/113; 716/106; 716/134

(58) Field of Classification Search
USPC .................. 716/106, 108, 113, 134
See application file for complete search history.

(56) References Cited

U.S. PATENT DOCUMENTS

| | | | |
|---|---|---|---|
| 6,086,626 A * | 7/2000 | Jain et al. | 716/103 |
| 6,615,395 B1 * | 9/2003 | Hathaway et al. | 716/113 |
| 6,714,902 B1 * | 3/2004 | Chao et al. | 703/14 |
| 7,363,605 B1 * | 4/2008 | Kondratyev et al. | 716/113 |
| 7,742,907 B2 * | 6/2010 | Gupta et al. | 703/14 |
| 2005/0097484 A1 * | 5/2005 | Sarwary et al. | 716/6 |
| 2007/0299648 A1 * | 12/2007 | Levitt et al. | 703/22 |
| 2008/0201671 A1 * | 8/2008 | Rejouan et al. | 716/6 |
| 2008/0288904 A1 * | 11/2008 | Rahim et al. | 716/6 |
| 2009/0132984 A1 * | 5/2009 | Chander et al. | 716/6 |

* cited by examiner

*Primary Examiner* — Thuan Do
*Assistant Examiner* — Brian Ngo
(74) *Attorney, Agent, or Firm* — Li & Cai Intellectual Property (USA) Office

(57) ABSTRACT

A functional timing analysis method, executed in a computing device, comprises: step A: obtaining a circuit; step B: selecting a target delay time from a delay time set for a node in the circuit for verifying whether the target delay time is attainable by some input assignment; step C: generating a timed characteristic function associated with the selected target delay time for the node recursively from the timed characteristic functions associated with the corresponding delay times for its fanin nodes is generated as a target formula; step D: recursively translating the timed characteristic function into timed characteristic function clauses of the target formula by using an implication operator; step E: checking whether the target formula is satisfied by using a Boolean satisfiability solver; and step F: if the target formula is satisfied, the selected target delay time is attainable by some input assignment to the circuit.

10 Claims, 3 Drawing Sheets

| $t$ | $[0, a_1]$ | $(a_{i-1}, a_i]$ | $(a_m, \infty)$ |
|---|---|---|---|
| $X^{f, \geq t}$ | 1 | $X^{f, \geq a_i}$ | 0 |
| $X^{f, <t}$ | 0 | $X^{f, <a_i}$ | 1 |
| $t$ | $[0, a_1^0]$ | $(a_{i-1}^0, a_i^0]$ | $(a_n^0, \infty)$ |
| $X^{f=0, \geq t}$ | $\neg f$ | $X^{f=0, \geq a_i^0}$ | 0 |
| $X^{f=0, <t}$ | 0 | $X^{f=0, <a_i^0}$ | $\neg f$ |
| $t$ | $[0, a_1^1]$ | $(a_{i-1}^1, a_i^1]$ | $(a_p^1, \infty)$ |
| $X^{f=1, \geq t}$ | $f$ | $X^{f=1, \geq a_i^1}$ | 0 |
| $X^{f=1, <t}$ | 0 | $X^{f=1, <a_i^1}$ | $f$ |

FIG. 2

FUNCTIONAL TIMING ANALYSIS METHOD FOR CIRCUIT TIMING VERIFICATION

BACKGROUND

1. Technical Field

The present disclosure relates to a timing analysis method for a circuit, in particular, to a functional timing analysis method for circuit timing verification.

2. Description of Related Art

In modern synthesis flow of very large scale integration (VLSI) system design, timing analysis is essential in identifying timing critical regions for re-synthesis, determining operable clock frequencies, and avoiding wasteful over-optimization and thus accelerating design closure in meeting stringent timing constraints. Since timing analysis has to be performed repeatedly during circuit design, the complex computation of timing analysis may cause serious overhead in the design process.

There are two main methods to timing analysis for a circuit, wherein one is a static timing analysis method, and the other one is a functional timing analysis method. The static timing analysis method, based on pure structural (or topological) analysis, through fast with linear-time complexity, can be too pessimistic in estimating circuit delay due to the ignorance of false or non-sensitizable paths of the circuit. On the other hand, the functional timing analysis method provides accurate delay calculation, but is computationally intractable, i.e. an NP-hard problem, in identifying false critical paths.

A timed characteristic function of a node in the circuit is used in the functional timing analysis method to characterize the set of input assignments to the circuit that make the output value of the node change from the initial unknown value to a final stabilized value and meet a specified timing requirement.

The conventional functional timing analysis method uses equation-based conversion to translate a complex timed characteristic function associated with a selected delay time into a conjunctive normal form formula for satisfiability solving. The conventional functional timing analysis method may use the Boolean satisfiability solver to check whether the conjunctive normal form formula is satisfiable.

If the conjunctive normal form formula is satisfiable, the selected delay time of the node is attainable (that is, there exists some input assignment whose signal propagation makes the node stabilize to its final value meeting the specified delay time constraint). Otherwise, the selected delay time of the node is not attainable (that is, there exists no input assignment whose signal propagation makes the node stabilize to its final value meeting the specified delay time constraint).

The conventional functional timing analysis method produces complex formulas making satisfiability solving inefficient. Therefore, the conventional functional timing analysis method is hardly applicable to analyzing complex designs.

SUMMARY

An exemplary embodiment of the present disclosure provides a functional timing analysis method, executed in a computing device, comprising: step A: obtaining a circuit; step B: selecting a target delay time from a delay time set for a node in the circuit; step C: generating a timed characteristic function associated with the selected target delay time for the node as a target formula; step D: recursively translating the timed characteristic function into timed characteristic function clauses of the target formula by using an implication-based conversion; step E: checking whether the target formula is satisfied by using a Boolean satisfiability solver; and step F: if the target formula is satisfied, outputting the information that the selected target delay time is satisfiable and the corresponding satisfying condition.

To sum up, an exemplary embodiment of the present disclosure provides a functional timing analysis method using an implication-based conversion to obtain the timed characteristic function clauses, which simplifies the resultant conjunctive normal form formula and thus makes Boolean satisfiability solving easier than the conventional functional timing analysis method.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 2 is a timed characteristic function equivalence class table according to an exemplary embodiment of the present disclosure.

DESCRIPTION OF THE EXEMPLARY EMBODIMENTS

Figure 1:
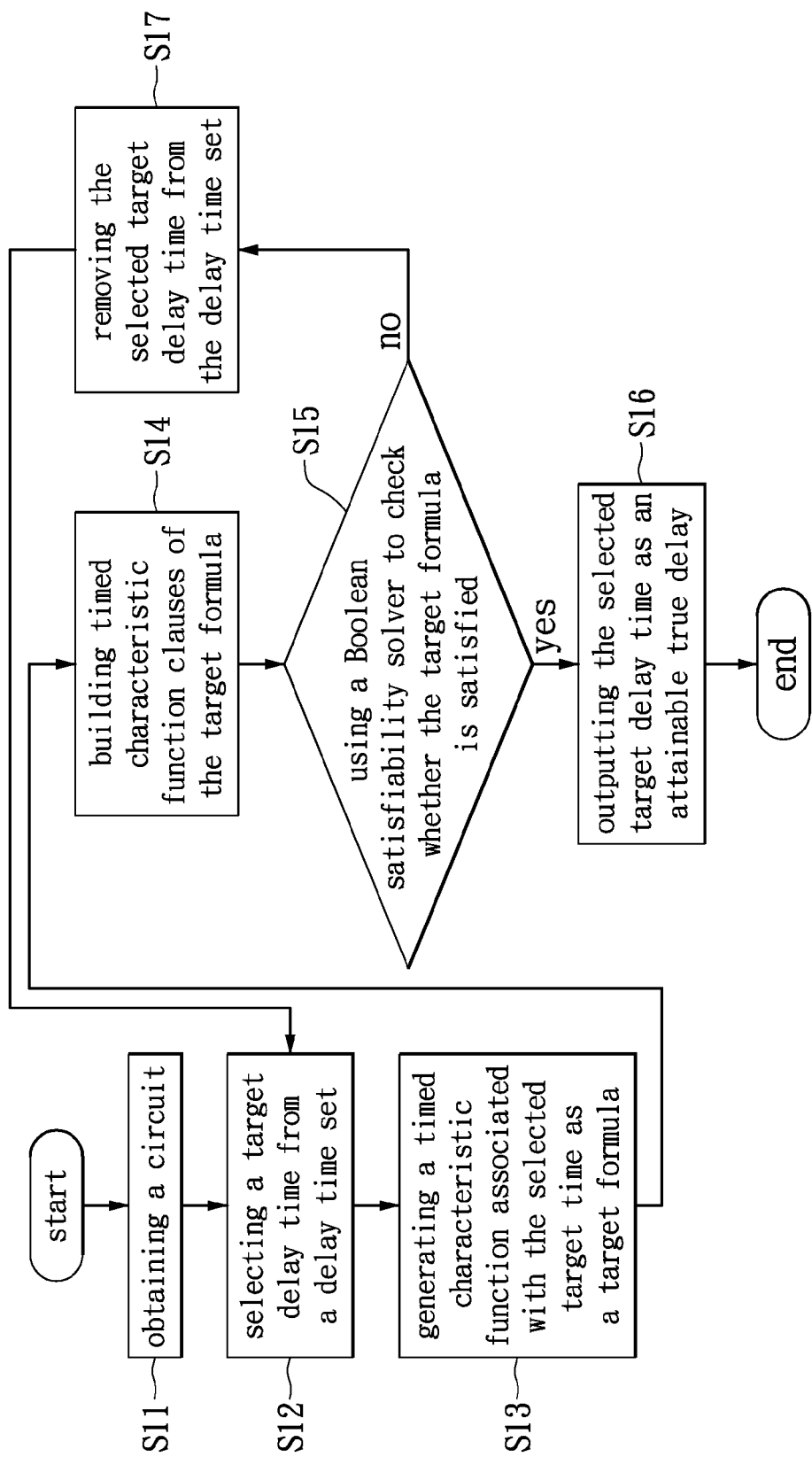
FIG. 1 is a flow chart of a functional timing analysis method according to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or similar parts.

An exemplary embodiment of the present disclosure provides a functional timing analysis method executed in a computing device, such as a computing server, a personal computer, or other computing devices. The functional timing analysis method can be recorded in a recording medium, such as a compact disc, a hard disk, or a non-volatile memory device, or other state-holding elements. The functional timing analysis method can be a subroutine or a tool of the CAD software for designing the circuit.

The functional timing analysis method firstly obtains a circuit. Then, a target delay time for a node in the circuit is selected, and a timed characteristic function associated with the selected target delay time for the node is generated as a target formula. Then, the timed characteristic function is recursively translated into timed characteristic function clauses of the target formula by using an implication-based conversion rather than using an equation-based conversion, and a Boolean satisfiability solver is used to check whether the target formula is satisfied. If the target formula is satisfied, the selected target delay time of the node is reported as attainable; otherwise the target delay time of the node should be re-selected whenever necessary.

It is noted that a timed characteristic function equivalence class table and an arrival time list computation can be optionally used to reduce the computation of the functional timing analysis method, thus accelerating the functional timing analysis method to check whether the target delay time of the node in the circuit is attainable.

[Definitions of Operators and Controlling Cube]

Before illustrating exemplary embodiments of the present disclosure, definitions of a controlling cube, a literal operator, and a polarity operator are disclosed.

Herein as notational convention to express propositional formulas, "¬" denotes Boolean negation or inversion, "∨" denotes Boolean conjunction, "∧" denotes Boolean disjunction, and "→" denotes Boolean implication. A literal is defined to be a Boolean variable or the negation of a Boolean variable. A cube is defined as a conjunction of literals, and a clause is defined as a disjunction of literals. A conjunctive normal form (CNF) formula is defined as a conjunction of clauses, which is the common input format for Boolean satisfiability solving. Herein a literal operator is denoted as lit(•) and is used to extract the literal of some variable from a cube. For example, the literals of variables a and b in the cube a ∨ ¬b are lit(a)=a and lit(b)=¬b, respectively. A polarity operator is denoted as pol(•), and is used to extract the polarity of a literal with 0 denoting a negated literal and with 1 denoting a non-negating literal. For example, pol(¬a) is 0, and pol(a) is 1.

Given an arbitrary logic gate with an output and more than one inputs, a controlling cube c is a product term (i.e., a conjunction of literals) that determines the output of the gate independent of the valuation of other inputs whose variables do not appear in c, and the controlling cube set C contains all controlling cubes c of the gate. Furthermore, a controlling cube set C can be the union of an onset $P_1$ and an offset $P_0$ excluding the set of minterms, wherein the onset $P_1$ contains the set of all prime implicants which make the output of the gate be 1, and the offset $P_0$ contains the set of all prime implicants which make the output of the gate be 0. Thus, the literal number of a controlling cube should be less than the number of the inputs associated with the gate.

For example, when the gate is an AND gate with one output f and two inputs a, b, the controlling cube set C of the AND gate is {¬a, ¬b}, since cubes ¬a and ¬b make the output f be 0 independent of the other input b and a, respectively. Since the onset $P_1$ is {a∨b} and the offset $P_0$ is {¬a, ¬b}, the controlling cube set C is the union of the onset $P_1$ and the offset $P_0$ excluding the minterm an b, that is, C={¬a, ¬b}. For example, when the gate is an XOR gate with one output f and two inputs a, b, the controlling cube set C of the XOR gate is a null set. For example, when the gate is an OR gate with one output f and two inputs a, b, the controlling cube set C of the OR gate is the set {a, b}.

[Exemplary Embodiment of Functional Timing Analysis Method]

Referring to FIG. 1, FIG. 1 is a flow chart of a functional timing analysis method according to an exemplary embodiment of the present disclosure. The functional timing analysis method is for example executed in a computer with a Linux operation system. Firstly, at step S11, the functional timing analysis method obtains a circuit to be analyzed. Then, at step S12, the functional timing analysis method selects a target delay time from a delay time set for a node in the circuit, wherein the delay time set may be a default delay time set with real or integer valued delay times, or the delay time set may be calculated by an arrival time list computation. It is noted that the arrival time list computation can further reduce the execution times associated with the translation and satisfiability solving steps, i.e. steps S12 through S15, but the present disclosure is not limited thereto.

At step S13, the functional timing analysis method generates a timed characteristic function associated with the selected target delay time for the node as a target formula. For example, the selected target delay time is denoted as t, the node is denoted as f, and thus the target formula is denoted as $\chi^{f,\geq t}$ for checking whether there exists an input assignment to the circuit making f stabilize to its final value at time greater than or equal to t. Then, at step S14, the functional timing analysis method recursively translates the timed characteristic function into timed characteristic function clauses of the target formula by using an implication-based conversion. The manner how to recursively translate the timed characteristic function into timed characteristic function clauses of the target formula by using an implication-based conversion is described in the sequent paragraphs. It is noted that there are three implementations of the translation described in the present disclosure, but the present disclosure is not limited thereto.

At step S15, the functional timing analysis method uses a Boolean satisfiability solver to check whether the target formula is satisfied. If the target formula is satisfied, step S16 is executed; otherwise, step S17 is executed. If the target formula is satisfied, it means that the selected target delay time for the node in the circuit is a true delay time, and thus at step S16, the functional timing analysis method outputs the selected target delay time as an attainable circuit delay for this node. If the target formula is not satisfied, it means that the selected target delay time is too large to be a true delay for this node, and thus at step S17, the functional timing analysis method removes the selected target delay time from the delay time set, and step S12 is then executed to select the next target delay time being smaller than the previously selected target delay time from the delay time set.

For example, a default delay time set {1, 2, 3, 4, 5} is given for the node in the circuit. Firstly, the target delay time is selected as 5, and the satisfiability of the target formula associated with the selected target delay time of 5 is checked. Assuming the maximum true delay time is 4, the satisfiability of the target formula associated with the selected target delay time of 5 is not met, and then the next delay time is selected as 4. The satisfiability of the target formula associated with the selected target delay time of 4 is met, and then the selected target delay time of 4 is output as a true delay of the node.

[Exemplary Embodiment of Implication Translation Manner of $1^{st}$ Implementation]

A first implementation manner which recursively translates the timed characteristic function into timed characteristic function clauses of the target formula by using an implication-based conversion is explained as follows. The first implementation manner does not consider whether the node value of the circuit stabilizes to logic value 0 or 1 with respect to an input assignment, wherein the implication of the target formula is shown as, $$\chi^{f,\geq t} \rightarrow \left(\bigvee_{g_i \in FI(f)} \chi^{g_i, \geq t-d_i}\right) \wedge \bigwedge_{c \in C} \left(\bigvee_{lit(g_i) \in c} \chi^{g_i, \geq t-d_i} \vee \neg\, lit(g_i)\right),$$

where FI denotes the set of inputs to the gate of output f, $d_i$ is the delay which the input $g_i$ passes through the gate to output f, and C is the controlling cube set of the gate of output f. It is noted that the implementation manner can be used for arbitrary logic gates. It is also noted that, since the target formula of output f is in terms of its inputs $g_i$, the construction is essentially recursive if $g_i$ is the output of another gate.

If the circuit is an AND gate with one output f and two inputs a, b, and the AND gate has one unit delay time, the implication formula is $\chi^{f,\geq t} \rightarrow [(\chi^{a,\geq t-1} \vee \chi^{b,\geq t-1}) \wedge (\chi^{a,\geq t-1} \vee a) \wedge (\chi^{b,\geq t-1} \vee b)]$, and thus the timed characteristic function clauses of the target formula can be shown as $(\neg \chi^{f,\geq t} \vee \chi^{a,\geq t-1} \vee \chi^{b,\geq t-1}) \wedge (\neg \chi^{f,\geq t} \vee \chi^{a,\geq t-1} \vee a) \wedge (\neg \chi^{f,\geq t} \vee \chi^{b,\geq t-1} \vee b)$. When the arrival times of the inputs a and b are 0 and 1 unit delay time, respectively, and the selected target delay time t is 2 unit delay time, the Boolean satisfiability solver checks if $\chi^{f,\geq 2}$ can be true (i.e., $\neg \chi^{f,\geq 2}$ be 0), and assigns $\chi^{a,\geq 1}$ to 0 and $\chi^{b,\geq 1}$ to 1 due to the arrival time constraints for a and b. The timed characteristic function clauses of the target formula ( $\vee \chi^{f,\geq 2} \vee \chi^{a,\geq 1} \wedge \chi^{b,\geq 1}) \neg (\vee \chi^{f,\geq 2} \vee \chi^{a,\geq 1} \wedge a) \neg (\vee \chi^{f,\geq 2} \vee \chi^{b,\geq 1} \neg b)$ should be satisfiable under input assignment a=1. Therefore the target delay time 2 of the output f is attainable.

If the circuit is an XOR gate with one output f and two inputs a, b, and the XOR gate has one unit delay time, the timed characteristic function clause of the target formula $\chi^{f,\geq t} \rightarrow (\chi^{a,\geq t-1} \vee \chi^{b,\geq t-1})$ can be shown as $(\neg \chi^{f,\geq t} \vee \chi^{a,\geq t-1} \vee \chi^{b,\geq t-1})$. When the arrival times of the inputs a, b are 1 and 2 unit delay time, respectively, and the selected target delay time t is selected to be 4 unit delay time, the Boolean satisfiability solver assumes $\neg \chi^{f,\geq 4}$ is 0 and assigns $\chi^{a,\geq 3}$ and $\chi^{b,\geq 3}$ to 0 given the fact that the arrival times of a and b are less than 3. As a consequence the timed characteristic function clause of the target formula $\neg \chi^{f,\geq 3} \vee \chi^{a,\geq 3} \vee \chi^{b,\geq 3}$ is unsatisfiable. It is concluded that the target delay 4 for f is not attainable. The target delay time is then selected to be 3 unit delay time. In a similar manner, the target formula associated with the selected target delay time of 3 unit delay time is satisfied. So the attainable delay time of the output f is 3 unit delay time.

If the circuit is a single complex gate with one output f and three inputs a, b, c, and the gate has one unit delay time and the controlling cube set C={$\neg a \wedge b, \neg b \wedge c$}, then the target formula $\chi^{f,\geq t} \rightarrow (\chi^{a,\geq t-1} \vee \chi^{b,\geq t-1} \vee \chi^{c,\geq t-1}) \wedge (\chi^{a,\geq t-1} \vee a \vee \chi^{b,\geq t-1} \vee \neg b) \wedge (\chi^{b,\geq t-1} \vee b \vee \chi^{c,\geq t-1} \vee \neg c)$ can be rewritten in the clause form as $(\neg \chi^{f,\geq t} \vee \chi^{a,\geq t-1} \vee \chi^{b,\geq t-1} \vee \chi^{c,\geq t-1}) \wedge (\neg \chi^{f,\geq t} \vee \chi^{a,\geq t-1} \vee a \vee \chi^{b,\geq t-1} \vee \neg b) \wedge (\neg \chi^{f,\geq t} \vee \chi^{b,\geq t-1} \vee b \vee \chi^{c,\geq t-1} \vee \neg c)$. When the arrival times of the inputs a, b, c are 0, 1, and 2 unit delay times, respectively, and the selected target time t is 3 unit delay time, the Boolean satisfiability solver will assume $\neg \chi^{f,\geq 3}$ is 0, and assign $\chi^{a,\geq 2}$ and $\chi^{b,\geq 2}$ to 0, and $\chi^{c,\geq 2}$ to 1. Since the formula $(\neg \chi^{f,\geq 3} \vee \chi^{a,\geq 2} \vee \chi^{b,\geq 2} \vee \chi^{c,\geq 2}) \wedge (\neg \chi^{f,\geq 3} \vee \chi^{a,\geq 2} \vee a \vee \chi^{b,\geq 2} \vee \neg) \wedge (\neg \chi^{f,\geq 3} \vee \chi^{b,\geq 2} \vee b \vee \chi^{c,\geq 2} \vee \neg c)$ is satisfied under the input assignment a=1 regardless of the values of b and c, the target delay time 3 is attainable for the output f.

[Exemplary Embodiment of Implication Translation Manner of $2^{nd}$ Implementation]

A second implementation manner which recursively translates the timed characteristic function into timed characteristic function clauses of the target formula by using an implication-based conversion is explained as follows. The second implementation manner considers whether the node value of the circuit is 0 or 1, wherein the target formula is the disjunction of a first sub target formula in which the output value of a node is 0 and a second sub target formula in which the output value of a node is 1, i.e. $\chi^{f,\geq t} = \neg \chi^{f=1,<t} \vee \neg \chi^{f=0,<t}$. Since $\chi^{f=1,\geq t}$ equals $\neg \chi^{f=1,<t}$ and $\chi^{f=0,\geq t}$ equals $\neg \chi^{f=0,<t}$, the equalities $\chi^{f,\geq t} = \chi^{f=1,\geq t} \vee \chi^{f=0,\geq t} = \neg \chi^{f=1,<t} \vee \neg \chi^{f=0,<t}$ hold.

The first sub implication of the target formula is shown as $$\neg \chi^{f=1,<t} \rightarrow \bigwedge_{c \in P_1} \bigvee_{lit(g_i) \in c} \neg \chi^{g_i = pol(lit(g_i)),<t-d_{r_i}},$$

and the second sub implication of the target formula is shown as $$\neg \chi^{f=0,<t} \rightarrow \bigwedge_{c \in P_0} \bigvee_{lit(g_i) \in c} \neg \chi^{g_i = pol(lit(g_i)),<t-d_{f_i}},$$

wherein $d_{r_i}$ and $d_{f_i}$ are the signal rising and falling delays, respectively, for a signal propagating from input $g_i$ through the gate to output f. It is noted that the implementation manner can be used in an arbitrary complex logic gate.

If the circuit is an AND gate with one output f and two inputs a, b, the AND gate has one unit delay time, and the onset $P_1$ and offset $P_0$ are {$a \wedge b$} and {$\neg a, \neg b$}, respectively, then the target formulas are $\neg \chi^{f=0,<t} \rightarrow (\neg \chi^{a=0,<t-1} \wedge \neg \chi^{b=0,<t-1})$ and $\neg \chi^{f=1,<t} \rightarrow (\neg \chi^{a=1,<t-1} \vee \neg \chi^{b=1,<t-1})$, whose equivalent clause forms are $(\chi^{f=0,<t} \vee \neg \chi^{a=0,<t-1})$ $(\chi^{f=0,<t} \vee \neg \chi^{b,<t-1})$ and $(\chi^{f=1,<t} \vee \neg \chi^{a=1,<t-1} \vee \neg \chi^{b=1,<t-1})$ respectively. When the arrival times of the inputs a, b are 0 and 1 unit delay time, respectively, and the selected target time t is 2 unit delay time, the Boolean satisfiability solver will assume $\chi^{f=0,<2}$ or $\chi^{f=1,<2}$ be 0, and will know $\chi^{a,\geq 1} = \neg \chi^{a,<1}$ is 0 and $\chi^{b,\geq 1} = \neg \chi^{b,<1}$ is 1. Since under $\chi^{f=1,<2} = 0$ the formula $(\chi^{f=1,<2} \vee \neg \chi^{a=1,<1} \vee \neg^{b=1,<1})$ is satisfiable, the selected target delay 2 of output f is attainable.

[Exemplary Embodiment of Implication Translation Manner of $3^{rd}$ Implementation]

A third implementation manner which recursively translates the timed characteristic function into timed characteristic function clauses of the target formula by using an implication-based conversion is explained as follows. The third implementation manner considers whether the node value of the circuit is 0 or 1, wherein the target formula is the disjunction of a first sub target formula in which the output value of a node is 0 and a second sub target formula in which the output value of a node is 1, i.e. $\chi^{f,\geq t} = \chi^{f=1,\geq t} \vee \chi^{f=0,\geq t}$. The first sub implication of the target formula is shown as $$\chi^{f=1,\geq t} \rightarrow f \wedge \bigwedge_{c \in P_1} \bigvee_{lit(g_i) \in c} (\chi^{g_i = pol(lit(g_i)),\geq t-d_{r_i}} \vee \neg lit(g_i)),$$

and the second sub implication of the target formula is shown as $$\chi^{f=0,\geq t} \rightarrow f \wedge \bigwedge_{c \in P_0} \bigvee_{lit(g_i) \in c} (\chi^{g_i = pol(lit(g_i)),\geq t-d_{f_i}} \vee \neg lit(g_i)).$$

It is noted that the implementation manner can be used for arbitrary complex gates.

[Another Exemplary Embodiment of Functional Timing Analysis Method]

As mentioned above, the arrival time list computation can be used to further reduce the execution time associated with the translation and satisfiability solving steps. When the arrival time list computation is used, the timed characteristic function equivalence class table may be applied (or looked up) while recursively translating the timed characteristic function into timed characteristic function clauses of the target formula, so as to accelerate functional timing analysis method.

Referring to FIG. 2, FIG. 2 is a timed characteristic function equivalence class table according to an exemplary embodiment of the present disclosure. When the delay time t in timed characteristic function $\chi^{f,\geq t}$ is in the rage $[0, a_1]$, i.e., $0 \leq t \leq a_1$, the timed characteristic function $\chi^{f,\geq t}$ reduces to logic value 1, wherein $a_1$ is the minimum arrival time of the output f. When the delay time t in the timed characteristic function $\chi^{f,\geq t}$ is in the rage $(a_{i-1}, a_i]$, i.e., $a_{i-1} < t \leq a_i$, the timed characteristic function $\chi^{f,\geq t}$ is equivalent to $\chi^{f,\geq t}$, wherein $a_{i-1}$ and $a_i$ with $a_{i-1} \leq a_i$ are the arrival times of the output f. When the delay time t in the timed characteristic function $\chi^{f,\geq t}$ is in the range $(a_m, \infty)$, i.e., $a_m < t < \infty$, the timed characteristic function $\chi^{f,\geq t}$ reduces to logic value 0, wherein $a_m$ is the maximum arrival time of the output f.

In a similar manner, when the delay time t in the timed characteristic function $\chi^{f,<t}$ is in the rage $[0, a_1]$, the timed characteristic function $\chi^{f,<t}$ reduces to logic value 0. When the delay time t in the timed characteristic function $\chi^{f,<t}$ is in the rage $(a_{i-1}, a_i]$, the timed characteristic function $\chi^{f,<t}$ is equivalent to $\chi^{f,<a_i}$. When the delay time t in the timed characteristic function $\chi^{f,<t}$ is in the rage $(a_m, \infty)$, the timed characteristic function $\chi^{f,<t}$ reduces to logic value 1.

When the delay time t in the timed characteristic function $\chi^{f=0,\geq t}$ is in the rage $[0, a^0_1]$, the timed characteristic function $\chi^{f=0,\geq t}$ reduces to Boolean function $\neg f$, wherein $a^0_1$ is the minimum falling arrival time of the output f. When the delay time t in the timed characteristic function $\chi^{f=0,\geq t}$ is in the range $(a^0_{i-1}, a^0_i]$, the timed characteristic function $\chi^{f=0,\geq t}$ is equivalent to $\chi^{f=0,\geq a^0_i}$, wherein $a^0_{i-1}$ and $a^0_i$ with $a^0_{i-1} \leq a^0_i$ are the falling arrival times of the output f. When the delay time t in the timed characteristic function $\chi^{f=0,\geq t}$ is in the rage $(a^0_n, \infty)$, the timed characteristic function $\chi^{f=0,\geq t}$ reduces to logic value 0, wherein $a^0_n$ is the maximum falling arrival time of the output f.

In a similar manner, when the delay time t in the timed characteristic function $\chi^{f=0,<t}$ is in the rage $[0, a^0_1]$, the timed characteristic function $\chi^{f=0,<t}$ reduces to logic value 0. When the delay time t in the timed characteristic function $\chi^{f=0,<t}$ is in the rage $(a^0_{i-1}, a^0_i]$, the timed characteristic function $\chi^{f=0,<t}$ is equivalent to $\chi^{f=0,<a^0_i}$. When the delay time t in the timed characteristic function $\chi^{f=0,<t}$ is in the rage $(a^0_n, \infty)$, the timed characteristic function $\chi^{f=0,<t}$ reduces to Boolean function $\neg f$.

When the delay time t in the timed characteristic function x is in the rage $[0, a^1_1]$, the timed characteristic function $\chi^{f=1,\geq t}$ reduces to Boolean function f, wherein $a^1_1$ is the minimum rising arrival time of the output f. When the delay time t in the timed characteristic function $\chi^{f=1,\geq t}$ is in the rage $(a^1_{i-1}, a^1_i]$, the timed characteristic function $\chi^{f=1,\geq t}$ is equivalent to $\chi^{f=1,\geq a^1_i}$, wherein $a^1_{i-1}$ and $a^1_i$ with $a^1_{i-1} \leq a^1_i$ are the rising arrival times of the output f. When the delay time t in the timed characteristic function $\chi^{f=1,\geq t}$ is in the rage $(a^1_p, \infty)$, the timed characteristic function $\chi^{f=1,\geq t}$ reduces to logic value 0, wherein $a^1_p$ is the maximum rising arrival time of the output f.

In a similar manner, when the delay time t in the timed characteristic function $\chi^{f=1,<t}$ is in the rage $[0, a^1_1]$, the timed characteristic function $\chi^{f=1,<t}$ reduces to logic value 0. When the delay time t in the timed characteristic function $\chi^{f=1,<t}$ is in the rage $(a^1_{i-1}, a^1_i]$, the timed characteristic function $\chi^{f=1,<t}$ is equivalent to $\chi^{f=1,<a^1_i}$. When the delay time t in the timed characteristic function $\chi^{f=1,<t}$ is in the rage $(a^1_p, \infty)$, the timed characteristic function $\chi^{f=1,<t}$ reduces to Boolean function f.

[Example for Demonstrating Functional Timing Analysis Method]

Figure 3:
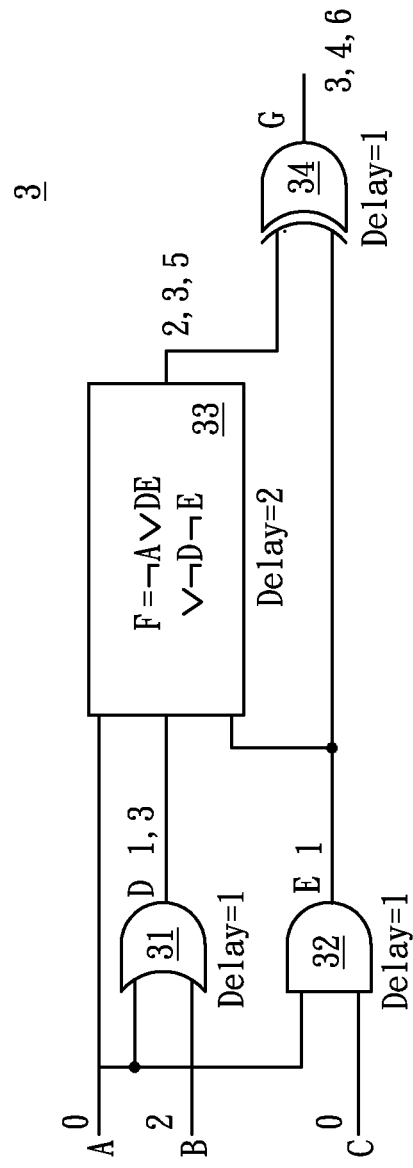
FIG. 3 is a circuit diagram for demonstrating the functional timing analysis method according to an exemplary embodiment of the present disclosure.

FIG. 3 is a circuit diagram for demonstrating the functional timing analysis method according to an exemplary embodiment of the present disclosure. The circuit 3 comprises multiple gates 31 through 34 with 1, 1, 2, and 1 unit delay times, respectively. The arrival times of the inputs A, B, C are 0, 2, 0 unit delay times, respectively. The arrival time list computation is performed, thus the node D has the arrival time list $\{1, 3\}$, the node E has the arrival time list $\{1\}$, the node F has the arrival time list $\{2, 3, 5\}$, and the output G has the arrival time list $\{3, 4, 6\}$. As mentioned above, the XOR gate has no controlling cube, and thus the arrival time list of the output G is merely dependent on the latest input F.

The arrival time list of the output G is the delay time set $\{3, 4, 6\}$, and the first selected target delay time is 6 unit delay time. The target formula is recursively built for $\chi^{G,\geq 6}$, and the timed characteristic function clauses of the target formula can be shown as $(\neg \chi^{G,\geq 6} \vee \chi^{E,\geq 5} \vee \chi^{F,\geq 5})$. By using the timed characteristic function equivalence class table, $\chi^{E,\geq 5}$ would be 0, and the timed characteristic function clauses of the target formula can be reduced to $(\neg \chi^{G,\geq 6} \vee \chi^{F,\geq 5})$.

The timed characteristic function $\chi^{F,\geq 5}$ can be further translated into multiple clauses by using the implication-based conversion, which can be shown as $(\neg \chi^{F,\geq 5} \vee \chi^{A,\geq 3} \vee \chi^{D,\geq 3} \vee \chi^{E,\geq 3}) \wedge (\neg \chi^{F,\geq 5} \vee \chi^{A,\geq 3} \vee A) \wedge (\neg \chi^{F,\geq 5} \vee \chi^{D,\geq 3} \vee \chi^{E,\geq 3} \vee D \vee E) \wedge (\neg \chi^{F,\geq 5} \vee \chi^{D,\geq 3} \vee \chi^{E,\geq 3} \vee \neg D \vee \neg E)$. By using the timed characteristic function equivalence class table, $\chi^{A,\geq 3}$ and $\chi^{E,\geq 3}$ equal 0, and the multiple clauses of the timed characteristic function $\chi^{F,\geq 5}$ can be reduced to $(\neg \chi^{F,\geq 5} \vee \chi^{D,\geq 3}) \wedge (\neg \chi^{F,\geq 5} \vee A) \wedge (\neg \chi^{F,\geq 5} \vee \chi^{D,\geq 3} \vee D \vee E) \wedge (\neg \chi^{F,\geq 5} \vee \chi^{D,\geq 3} \vee \neg D \vee \neg E)$.

The timed characteristic function $\chi^{D,\geq 3}$ can be further translated into multiple clauses by using the implication-based conversion, which can be shown as $(\neg \chi_{D,\geq 3} \vee \chi^{A,\geq 2} \vee \chi^{B,\geq 2}) \wedge (\neg \chi^{D,\geq 3} \vee \chi^{A,\geq 2} \vee \neg A) \wedge (\neg \chi^{D,\geq 3} \vee \chi^{B,\geq 2} \vee \neg B)$. By using the timed characteristic function equivalence class table, $\chi^{A,\geq 2}$ and $\chi^{B,\geq 2}$ reduces to 0 and 1, respectively, and the multiple clauses of the timed characteristic function $\chi^{D,\geq 3}$ can be reduced to $(\neg \chi^{D,\geq 3} \vee \neg A)$.

Accordingly, the timed characteristic function clauses of the target formula is obtained as the conjunction of the above clauses $(\neg \chi_{G,\geq 6} \vee \chi^{F,\geq 5}) \wedge (\neg \chi^{F,\geq 5} \vee \chi^{D,\geq 3}) \wedge (\neg \chi^{F,\geq 5} \vee A) \wedge (\neg \chi^{F,\geq 5} \vee \chi^{D,\geq 3} \vee D \vee E) \wedge (\neg \chi^{F,\geq 5} \vee \chi^{D,\geq 3} \vee \neg D \vee \neg E) \wedge (\neg \chi^{D,\geq 3} \vee \neg A)$. The Boolean satisfiability solver assumes $\chi^{G,\geq 6}$ is 1, and solves this target formula. Since the formula would be satisfiable only when $\chi^{F,\geq 5}$, $\chi^{D,\geq 3}$, A and $\neg$ A are 1, a conflict arises and thus the formula is unsatisfiable. Thus, the maximum delay time of the output G is not 6 unit delay time, and the next target delay time of the output G is selected to be 4 unit delay time.

The target formula is recursively built for $\chi^{G,\geq 4}$, and the timed characteristic function clauses of the target formula can be obtained as $(\neg \chi^{G,\geq 4} \vee \chi^{F,\geq 3}) \wedge (\neg \chi^{F,\geq 3} \vee \chi^{D,\geq 1} \vee \chi^{E,\geq 1}) \wedge (\neg \chi^{F,\geq 3} \vee A)$ by a similar manner mentioned above. The Boolean satisfiability solver assumes $\chi^{G,\geq 4}$ is 1, and solves the formula. It yields a satisfying solution with $\chi^{F,\geq 3}$, $\chi^{D,\geq 1}$ and A being 1. Thus, the maximum delay time of the output G is 4 unit delay time.

[Results of Exemplary Embodiment]

To sum up, an exemplary embodiment of the present disclosure provides a functional timing analysis method using the implication-based conversion to obtain the timed characteristic function clauses, which reduces the computation. Furthermore, a timed characteristic function equivalence class table and an arrival time list computation can be optionally used to further simplify the computation. Moreover, the functional timing analysis method can be used for arbitrary logic gates, and under both the combined rise/fall time delay model and the separated rise/fall time delay model of a circuit.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A functional timing analysis method, comprising:
   step A: obtaining a circuit, by using a computing device;
   step B: selecting a target delay time from a delay time set for a node in the circuit, by using the computing device;
   step C: generating a timed characteristic function associated with the selected target delay time for the node as a target formula, by using the computing device;
   step D: recursively translating the timed characteristic function into timed characteristic function clauses of the target formula by using an implication-based conversion, by using the computing device;
   step E: using a Boolean satisfiability solver to check whether the target formula is satisfiable, by using the computing device;
   step F: if the target formula is satisfied, outputting the selected target delay time as an attainable true delay, by using the computing device; and
   step G: if the target formula is not satisfied, outputting the selected target delay time as an unattainable true delay or other relevant information, by using the computing device.

2. The functional timing analysis method according to claim 1, further comprising:
   step H: if the target formula is not satisfied, removing the selected target delay time from the delay time set, and then repeating steps B through G, by using the computing device.

3. The functional timing analysis method according to claim 1, wherein the delay time set is calculated by an arrival time list computation.

4. The functional timing analysis method according to claim 1, wherein a timed characteristic function equivalence class table is looked up while recursively translating the timed characteristic function into timed characteristic function clauses of the target formula.

5. The functional timing analysis method according to claim 1, wherein the functional timing analysis method is used for arbitrary logic gates.

6. The functional timing analysis method according to claim 1, wherein the functional timing analysis method is used under combined or separated rise/fall time delay models.

7. The functional timing analysis method according to claim 1, wherein the implication of the target formula is shown as, $$\chi^{f,\geq t} \to \left( \bigvee_{g_i \in FI(f)} \chi^{g_i, \geq t-d_i} \right) \wedge \bigwedge_{c \in C} \bigvee_{lit(g_i) \in c} (\chi^{g_i, \geq t-d_i} \vee \neg lit(g_i)),$$

wherein the node is denoted as f, the selected target delay time is denoted as t, an input set of the node f is denoted as FI(f), an input is denoted as $g_i$, a controlling cube set of the node f is denoted as C, a controlling cube c belongs to the controlling cube set C, $d_i$ is presenting of the delay for which a signal propagates from the input $g_i$ through the gate to the output f, and lit($g_i$) corresponds to the literal of the input $g_i$ in the controlling cube c.

8. The functional timing analysis method according to claim 1, wherein the implication of the target formula is the union of a first sub implication of the target formula for which the node output valuates 0 and a second sub implication of the target formula for which the node output valuates 1.

9. The functional timing analysis method according to claim 8, wherein the first sub implication of the target formula is shown as $$\neg \chi^{f=1,<t} \to \bigwedge_{c \in P_1} \bigvee_{lit(g_i) \in c} \neg \chi^{g_i=pol(lit(g_i)),<t-d_{r_i}},$$

and the second sub implication of the target formula is shown as $$\neg \chi^{f=0,<t} \to \bigwedge_{c \in P_0} \bigvee_{lit(g_i) \in c} \neg \chi^{g_i=pol(lit(g_i)),<t-d_{f_i}},$$

wherein the node is denoted as f, the selected target delay time is denoted as t, the set of prime implicants of the onset of node f is denoted as $P_1$, the set of prime implicants of the offset of node f is denotes as $P_0$, an input $g_i$ of the node is denoted as $g_i$, a cube c is in $P_1$ or $P_0$, lit($g_i$) corresponds to the literal of the input gi in cube c, the polarity of the literal of the input $g_i$ is denoted as pol(lit($g_i$)) (which equals value 1 for a non-negated literal and value 0 for a negated literal), and $d_{fi}$ and $d_{r_i}$ represent the falling and rising delays, respectively, for which a signal propagates from the input $g_i$ through the gate to the output f.

10. The functional timing analysis method according to claim 8, wherein the first sub implication of the target formula is shown as $$\chi^{f=1,\geq t} \to f \wedge \bigwedge_{c \in P_1} \bigvee_{lit(g_i) \in c} (\chi^{g_i=pol(lit(g_i)),\geq t-d_{r_i}} \vee \neg lit(g_i)),$$

and the second sub implication of the target formula is shown as $$\chi^{f=0,\geq t} \to f \wedge \bigwedge_{c \in P_0} \bigvee_{lit(g_i) \in c} (\chi^{g_i=pol(lit(g_i)),\geq t-d_{f_i}} \vee \neg lit(g_i)),$$

wherein the node is denoted as f, the selected target delay time is denoted as t, the set of prime implicants of the onset of node f is denoted as $P_1$, the set of prime implicants of the offset of node f is denotes as $P_0$, an input $g_i$ of the node is denoted as $g_i$, a cube c is in $P_1$ or $P_0$, lit($g_i$) corresponds to the literal of the input $g_i$ in cube c, the polarity of the literal of the input $g_i$ is denoted as pol(lit($g_i$)), and $d_{fi}$ and $d_{r_i}$ represent the falling and rising delays, respectively, for which a signal propagates from the input $g_i$ through the gate to the output f, wherein pol(lit($g_i$)) equals value 1 for the literal of the input $g_i$ in cube c is a non-negated literal, and equals value 0 for the literal of the input $g_i$ in cube c is a negated literal.

* * * * *